(12) United States Patent
Li et al.

(10) Patent No.: US 11,196,928 B2
(45) Date of Patent: Dec. 7, 2021

(54) OPTICAL COLLECTION MODULE

(71) Applicant: AAC Optics Solutions Pte. Ltd., Singapore (SG)

(72) Inventors: Linzhen Li, Shenzhen (CN); Zhuming Chu, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 17/017,737

(22) Filed: Sep. 11, 2020

(65) Prior Publication Data

US 2020/0412958 A1 Dec. 31, 2020

Related U.S. Application Data

(63) Continuation of application No. PCT/CN2019/089720, filed on Jun. 1, 2019.

(51) Int. Cl.
| | | |
|---|---|---|
| *G02B 27/64* | (2006.01) | |
| *G03B 5/00* | (2021.01) | |
| *H04N 5/232* | (2006.01) | |
| *H04N 5/225* | (2006.01) | |

(52) U.S. Cl.
CPC ....... *H04N 5/23287* (2013.01); *G02B 27/646* (2013.01); *G03B 5/00* (2013.01); *H04N 5/2254* (2013.01)

(58) Field of Classification Search
USPC ......... 396/52–55; 348/208.8, 208.11, 208.99
See application file for complete search history.

(56) References Cited

U.S. PATENT DOCUMENTS

| | | | |
|---|---|---|---|
| 9,395,551 B2 * | 7/2016 | Ando | G02B 27/646 |
| 2017/0003516 A1 * | 1/2017 | Kiyamura | G02B 27/646 |
| 2017/0272658 A1 * | 9/2017 | Ito | G03B 13/02 |
| 2020/0355803 A1 * | 11/2020 | Gao | G02B 26/105 |

* cited by examiner

*Primary Examiner* — Clayton E. LaBalle
*Assistant Examiner* — Warren K Fenwick
(74) *Attorney, Agent, or Firm* — W&G Law Group

(57) ABSTRACT

The present invention provides an optical collection module, including a bracket, a rotating assembly, a driving assembly for driving the rotating assembly to rotate, and a restoring module. The rotating assembly includes a main body and a prism installed to the main body. The driving assembly includes a magnet and several coils. The main body is rotatably mounted on the bracket. The magnet is installed to one of the bracket and the main body; the coils are installed to the other of the bracket and the main body. The magnet includes two polar faces along the polarization direction; the coils are opposite to one of the polar faces of the magnet. The invention cooperates with the coils through the magnet to make the rotating assembly rotate in multiple directions relative to the mounting plate, thereby the moving range of prism increases accordingly.

6 Claims, 9 Drawing Sheets

OPTICAL COLLECTION MODULE

FIELD OF THE PRESENT DISCLOSURE

The present invention relates to the technical field of optical technologies, and more particularly relates to an optical collection module.

DESCRIPTION OF RELATED ART

The main function of OIS (Optical Image Stabilization) is to adjust the camera's field of view to facilitate compensation for hand shake of the user. OIS is mainly achieved by "lens shift", that is, when the lens moves or the camera tilts, the lens and the image sensor tilt together, but the range of position movement of the prism is limited. Therefore, there's a need to provide an improved optical collection module to overcome the problem mentioned.

SUMMARY OF THE INVENTION

One of the major objects of the invention is to provide an optical collection module with increased moving range of a prism thereof.

Accordingly, the present invention provides an optical collection module, including a bracket, a rotating assembly, a driving assembly for driving the rotating assembly to rotate, and a restoring module. The rotating assembly includes a main body and a prism installed to the main body. The driving assembly includes a magnet and several coils. The main body is rotatably mounted on the bracket. The magnet is installed to one of the bracket and the main body; the coils are installed to the other of the bracket and the main body. The magnet includes two polar faces along the polarization direction; the coils are opposite to one of the polar faces of the magnet. The invention cooperates with the coils through the magnet to make the rotating assembly rotate in multiple directions relative to the mounting plate, thereby the moving range of prism increases accordingly.

Further, the restoring module includes a first force restoring magnet and a second force restoring magnet spaced apart from each other; the first force restoring magnet is installed to the bracket, the second force restoring magnet is installed to the rotating assembly; the first force restoring magnet and the second force restoring magnet are opposite and attract each other.

Further, the main body includes a rotary axis, the bracket includes a mounting base, and the rotary axis and the mounting base are spherically matched.

Further, the main body further includes a mounting plate, the prism is installed on one side of the mounting plate, and the magnet and the rotary axis are mounted on the other side of the mounting plate.

Further, the mounting base is provided with a through hole, and one end of the rotary axis is connected to the second force restoring magnet via the through hole.

Further, the main body further includes a connector, a groove is provided at one end of the connector, and one end of the rotary axis is fixed into the groove after passing through the through hole, the other end of the connector is connected to the second force restoring magnet.

Further, the bracket includes a lower housing and a fixing plate installed on the lower housing, and the first force restoring magnet is installed on the lower housing, the mounting base is arranged on the fixing plate.

Further, the lower housing includes two side walls for forming a triangle shape cooperatively with the fixing plate, and the first force restoring magnet is installed at a junction of the two side walls.

Further, the triangle is an isosceles triangle, and when the coil is not powered, the mounting plate, the rotary axis, the center of the first force restoring magnet and the second force restoring magnet are located along a straight line.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

Figure 1:
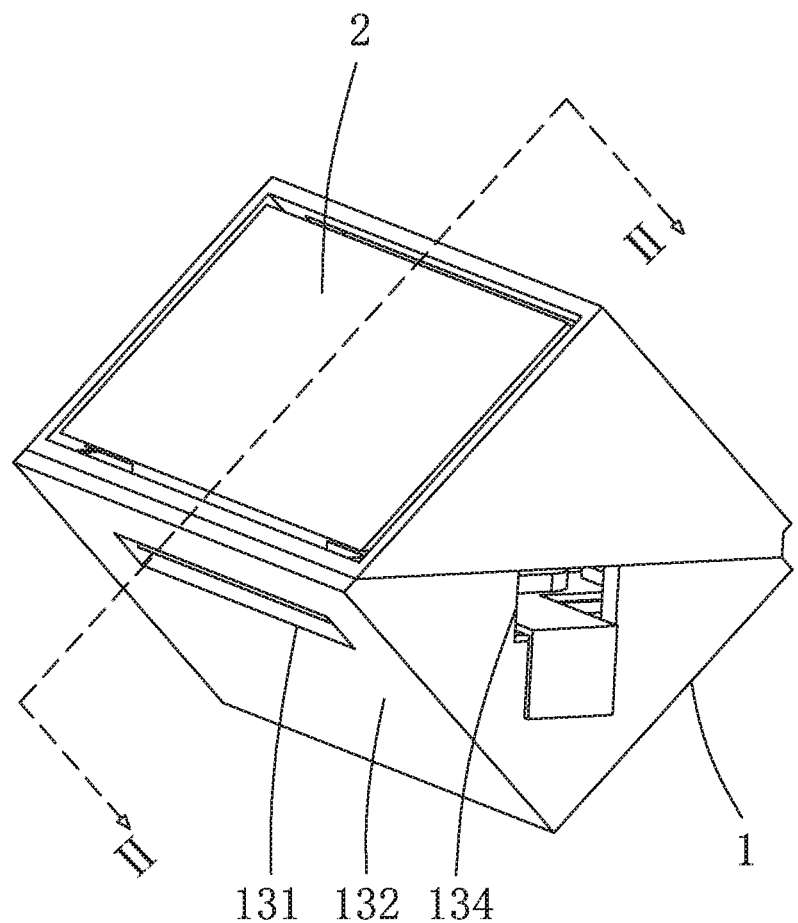
FIG. 1 is an isometric view of an optical collection module in accordance with an exemplary embodiment of the present invention.
Figure 2:
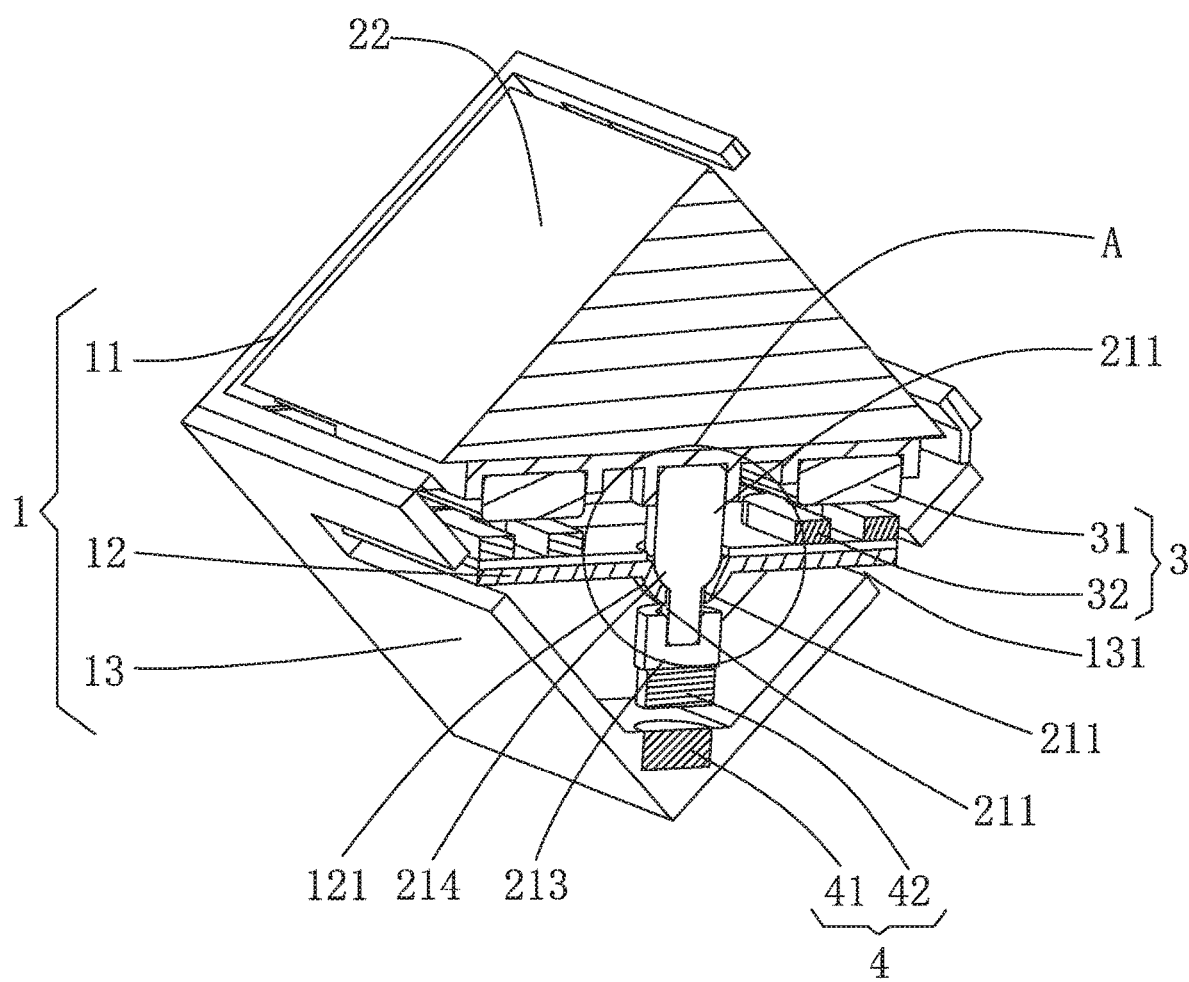
FIG. 2 is a cross-sectional view of the optical collection module in FIG. 1, taken along line II-II.

FIG. is an enlarged view of Part A of FIG. 2.

Figure 5:
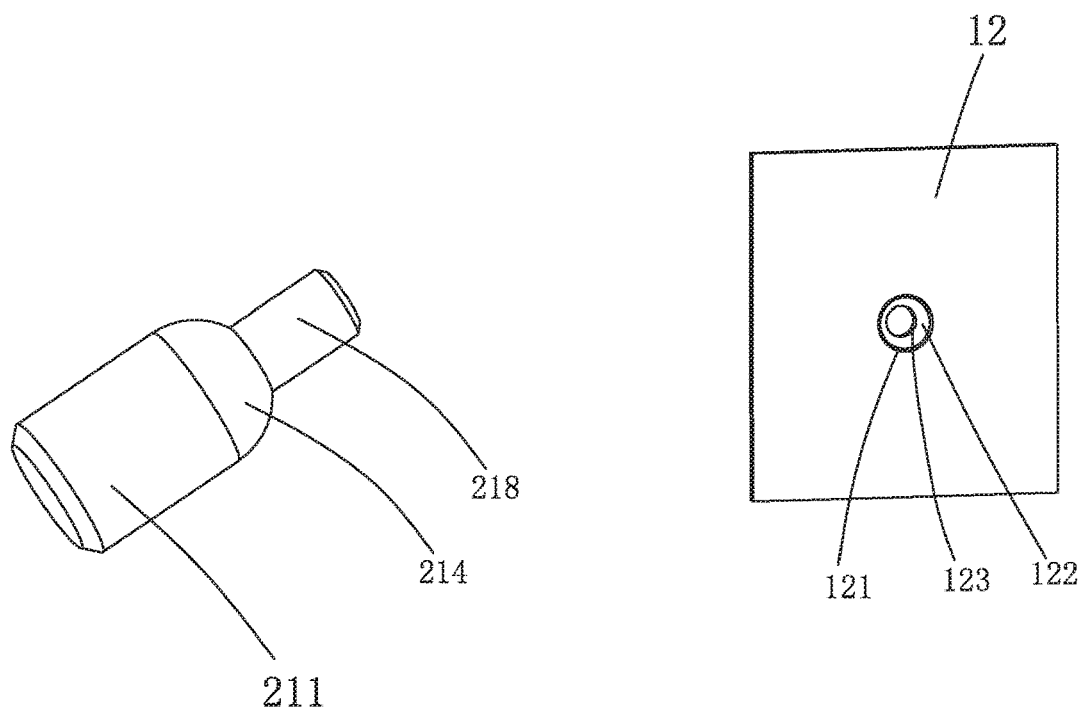

FIG. 5 is an isometric view of a fixing plate of the optical collection module.

Figure 6:
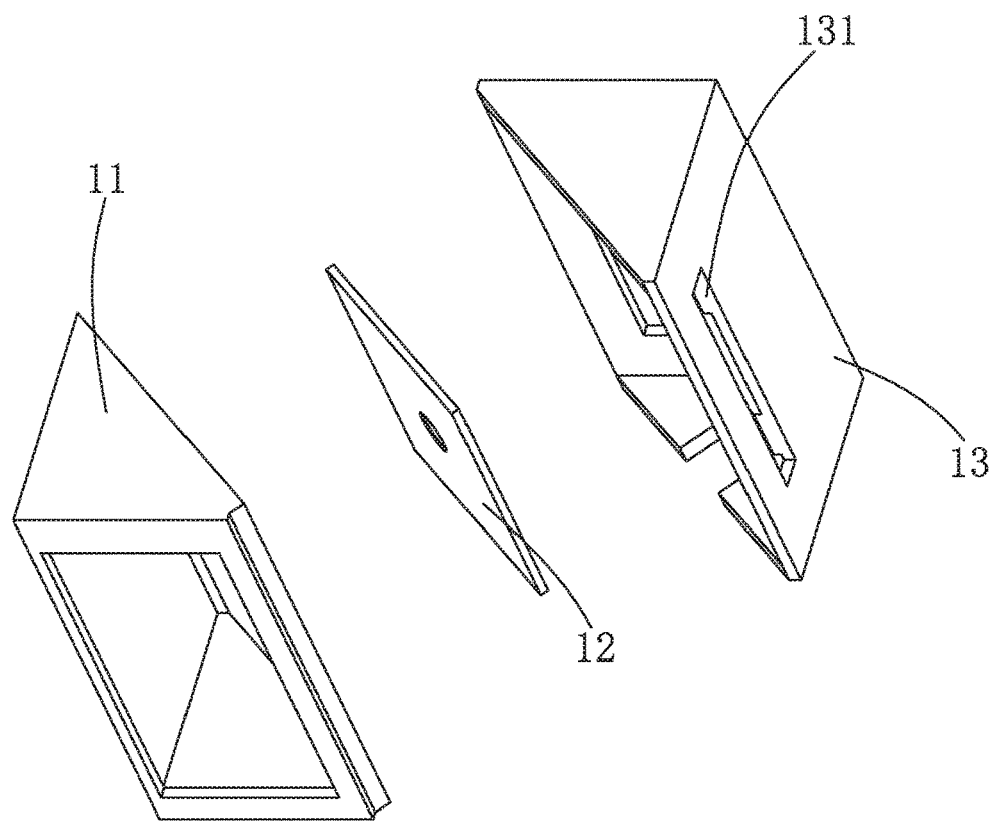

FIG. 6 is an isometric and exploded view of a bracket of the optical collection module.

Figure 7:
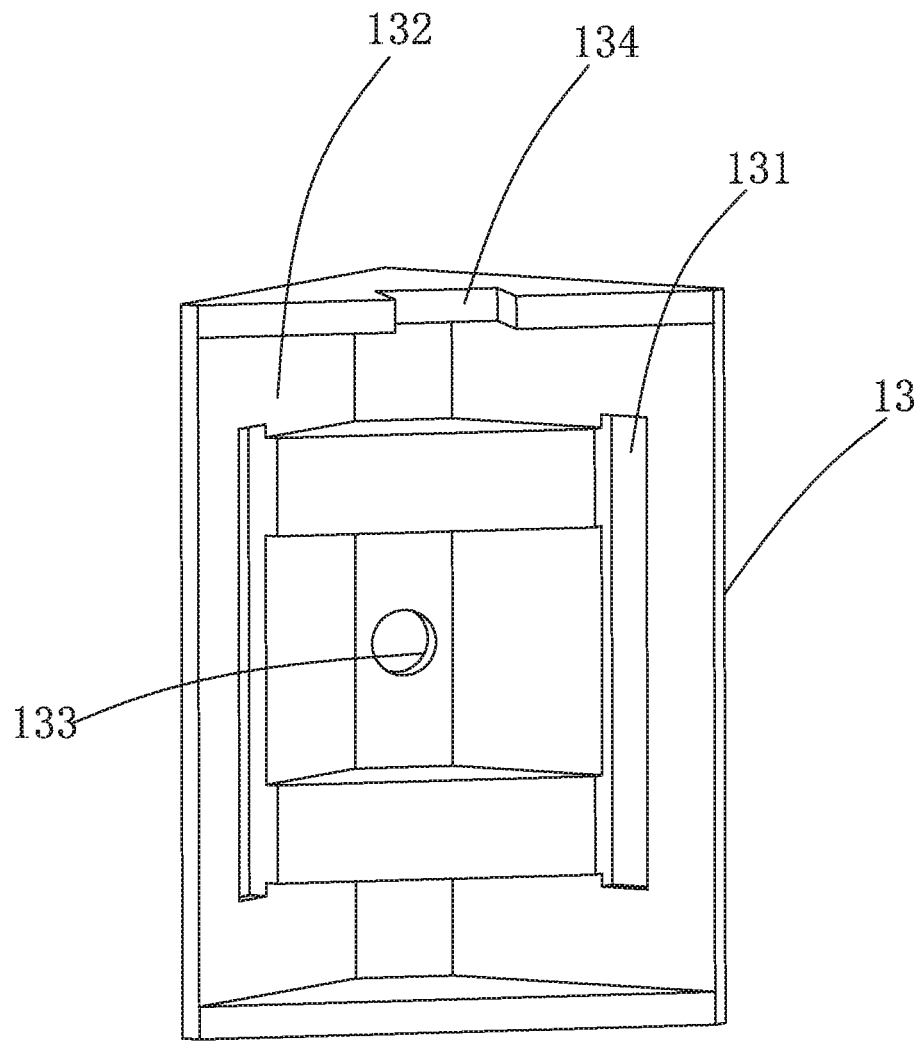

FIG. 7 is anisometric view of a lower housing of the optical collection module.

Figure 8:
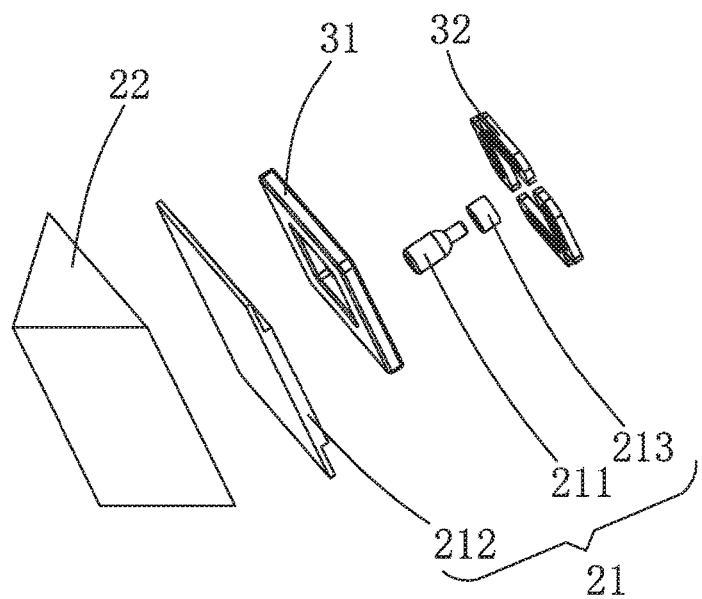

FIG. 8 is an exploded view of a body of the optical collection module.

Figure 9:
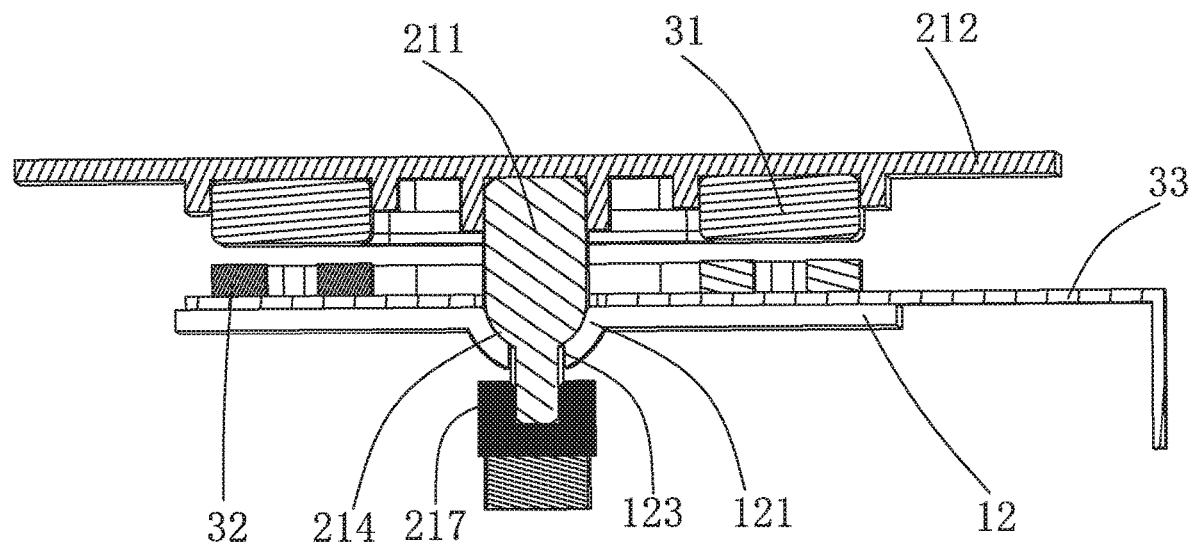

FIG. 9 is a partial front sectional view of the optical collection module in FIG. 2.

Figure 10:
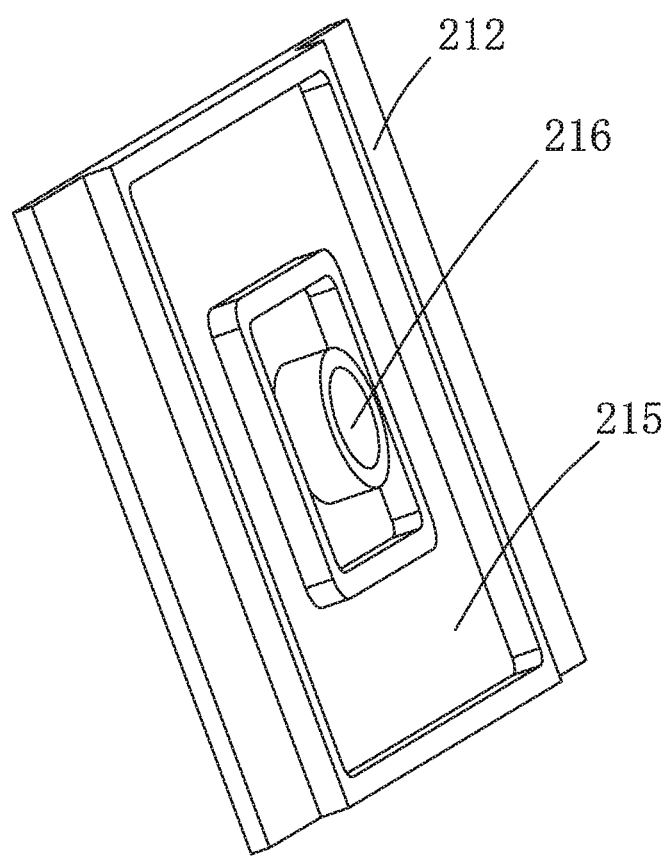

FIG. 10 is an isometric view of a mounting plate of the optical collection module.

Figure 11:
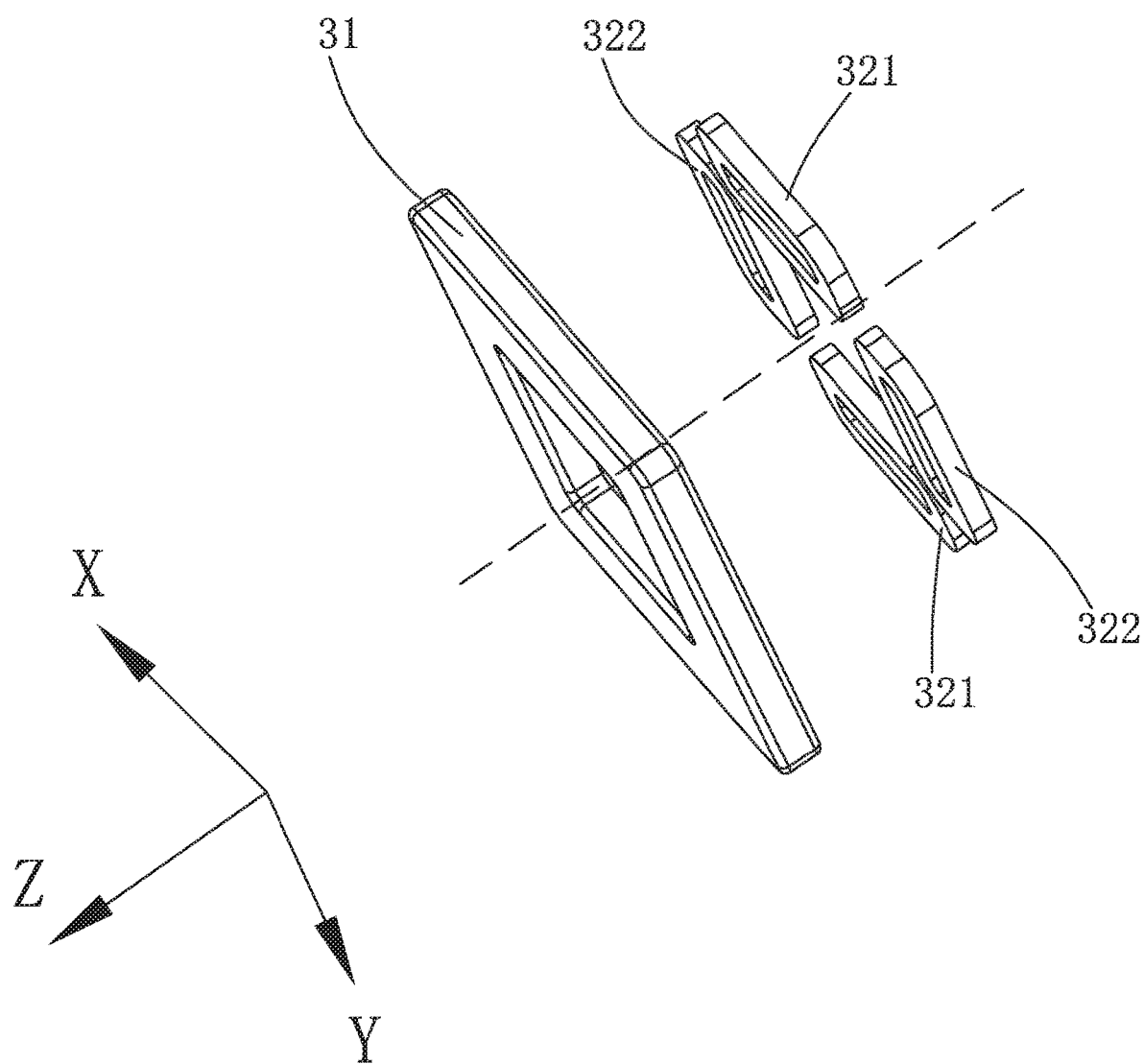

FIG. 11 is an exploded view of a driving assembly of the optical collection module.

Figure 12:
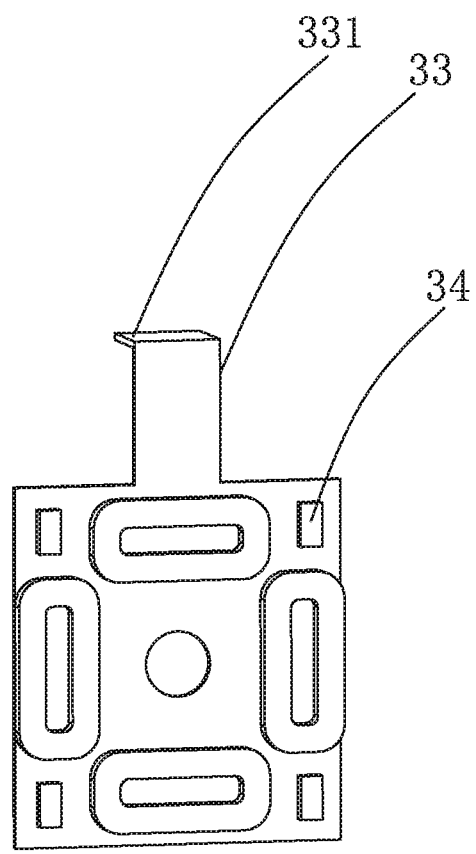

FIG. 12 is an isometric view of a flexible circuit plate of optical collection module, from a top aspect.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-4, an optical collection module, includes a bracket 1, a rotating assembly 2 rotatably installed to the bracket 1, a driving assembly 3 for driving the rotating assembly 2 to rotate relative to the bracket 1, and a restoring module 4 for resetting the rotating assembly 1.

Please refer to FIGS. 2-5, the bracket 1 includes an upper housing 11, a fixing plate 12 and a lower housing 13. The lower housing 13 is provided with multiple mounting slots 131. The fixing plate 12 passes through the multiple mounting slots 131 and is fixedly connected to the lower housing 13. Specifically, the lower housing 13 includes a pair of side walls 132; and a mounting base 121 is provided in the middle of the fixing plate 12. A thickness of the mounting base 121 is greater than a thickness of the other parts of the fixing plate 12. The mounting base 121 includes an accommodation part 122 and a through hole 123 provided on the accommodation part 122 for facilitating the rotating assembly 2 to pass through the mounting base 121. Preferably, the accommodation part 122 is bowl-shaped for accommodating a part of the rotating assembly 2 and rotates with and contacts it, so that the rotating assembly 2 can rotate relative to the mounting base 121 in multiple directions for improving performance.

The lower housing 13 includes two oppositely arranged side walls 132. In the XY plane, the two side walls 132 and the fixing plate 12 form a triangle shape. The triangle has stability and improves the stability of the connection between the lower housing 13 and the fixing plate 12. A concave 133 is arranged at the junction of the two side walls 132.

Please refer to FIGS. 2, 3, 7, and 8, the rotating assembly 2 includes a main body 21 and a prism 22 installed to the main body 21. The driving assembly 3 includes a magnet 31 and a plurality of coils 32. Wherein, the main body 21 is rotatably installed on bracket 1; the magnet 31 is installed on one of the bracket 1 and the main body 21, and several coils 32 are installed on the other of the bracket 1 and the main body 21. The main body 21 includes a mounting plate 212, a rotary axis 211 fixed to the mounting plate 212, and a connector 213 placed at the end of the rotary axis 211.

In this embodiment, the prism 22 is installed on one side of the mounting plate 212. The magnet 31 and the rotary axis 211 are installed on the other side of mounting plate 212 away from prism 22; the end of the rotary axis 211 passes through the through hole 123 of the mounting hole 121. The rotary axis 211 and the accommodation part 122 of the mounting base 121 are spherically matched, so that the rotary axis 211 can rotate relative to the mounting base 121 in three-dimensional space. Multiple coils 32 are installed on the side of the fixing plate 12 facing the magnet 31. The coils 32 are arranged opposite to magnet 31 with a certain distance. Wherein, after being powered on, the multiple coils 32 generates an inductive magnetic field. Inductive magnetic field interacts with permanent magnetic field of the magnet 31, specifically, attract or repel each other, so that the magnet 31 drives the rotating assembly 2 to rotate relative to bracket 1.

The driving assembly 3 further includes a flexible circuit plate 33 installed between the multiple coils 32 and the fixing plate 12, and a magnetism sensor 34 evenly fixed on the flexible circuit plate 33. The flexible circuit plate 33 is electrically connected to the multiple coils 32 for supplying power to the coils 32.

Please refer to FIGS. 2-4, and 9, the restoring module 4 includes a first force restoring magnet 41 and a second force restoring magnet 42. The first force restoring magnet 41 is installed in the concave 133 on the lower housing 13, that is, the junction of the two side walls 132. The second force restoring magnet 42 can be detached and installed to the end of connector 213 away from the rotary axis 211. The second force restoring magnet 42 and the first force restoring magnet 41 fixed at the bottom of the lower housing 13 are separated from each other by a certain distance. The polarities of the opposite sides of the two force restoring magnet 31 are opposite. In this way, suction force is generated between the second force restoring magnet 42 and the first force restoring magnet 41, so that the rotating assembly 2 at the top can be pulled, then the arc part 214 of the rotary axis 211 and the accommodation part 122 are always in contact and can relatively rotate. The first force restoring magnet 41 and the second force restoring magnet 42 form a magnetic spring. Preferably, the equivalent rigidity of the magnetic spring is about 0.0115 mNm/deg.

Referring to FIGS. 2, 5, and 9 together, the mounting plate 212 is provided with an accommodation cavity 215 and a mounting hole 216 on the side away from prism 22. The magnet 31 is fixed in the accommodation cavity 215. One end of the rotary axis 211 is fixed in the mounting hole 216. The other end of the rotary axis 211 passes through the through hole 123 and is fixed to the connector 213. The rotary axis 211 and the mounting base 121 are spherically matched, so that the rotary axis 211 can rotate in any direction in the mounting base 121. The connector 213 is provided with a groove 217, and the end of the rotary axis 211 is inserted into the groove 217 and fixed to the connector 213. The outer diameter of the connector 213 is larger than the inner diameter of the through hole 123 of the accommodation part 122 and the outer diameter of the end of the rotary axis, which prevents the end of the rotary axis 211 from exiting from the through hole 123 of the accommodation part 122. Moreover, the outer diameter of the connector 213 is larger than the outer diameter of the end of the rotary axis 211, and the end of the rotary axis 211 is fixed to the second force restoring magnet 42 by the connector 213, so that a larger area of the second force restoring magnet 42 can be used to improve the elastic restoring force of the magnetic spring.

In this embodiment, the magnet 31 is magnetized in a single direction and polarizes along its thickness direction (In this embodiment, the thickness direction of the magnet 31 is parallel to the axis direction of the rotary axis). Two polar faces are included along the polarization direction, and one side of the magnet 31 is N pole and the other side is S pole. Multiple coils 32 are placed on the side of the magnet 31 along the polarization direction and are opposite to one of the polar faces of the magnet 31. Preferably, the magnet 31 is a hollow zigzag structure with a through hole 32 arranged in the middle. Four piece side frames are arranged around the through hole 32, and the rotary axis 211 passes through the through hole.

Referring to FIGS. 2 and 11, in this embodiment, the number of multiple coils 32 is four and the coils 32 are respectively installed on the side of the fixing plate 12 facing the magnet 31. Preferably, each coil 32 is directly opposite to a side frame of the magnet 31. In this embodiment, every two opposite coils form a group to form a first coil group 321 and a second coil group 322. The two coils in the same group are placed on both sides of the rotary axis 211 and are connected in series and reversed. After being electrified, two coils in the same group generate inductive magnetic fields in two opposite directions, so that one electrified coil attracts the magnet, and the other electrified coil repels the magnet. Therefore, torque in two the same direction are generated between two coils and the magnet in the same group after being electrified so as to drive the rotating assembly to rotate around the mounting base 121 and adjust the angle of prism. Preferably, when the coil is not electrified, the plane where the coil 32 is placed keeps parallel relative to the plane where the magnet 31 is placed.

Figure 3:
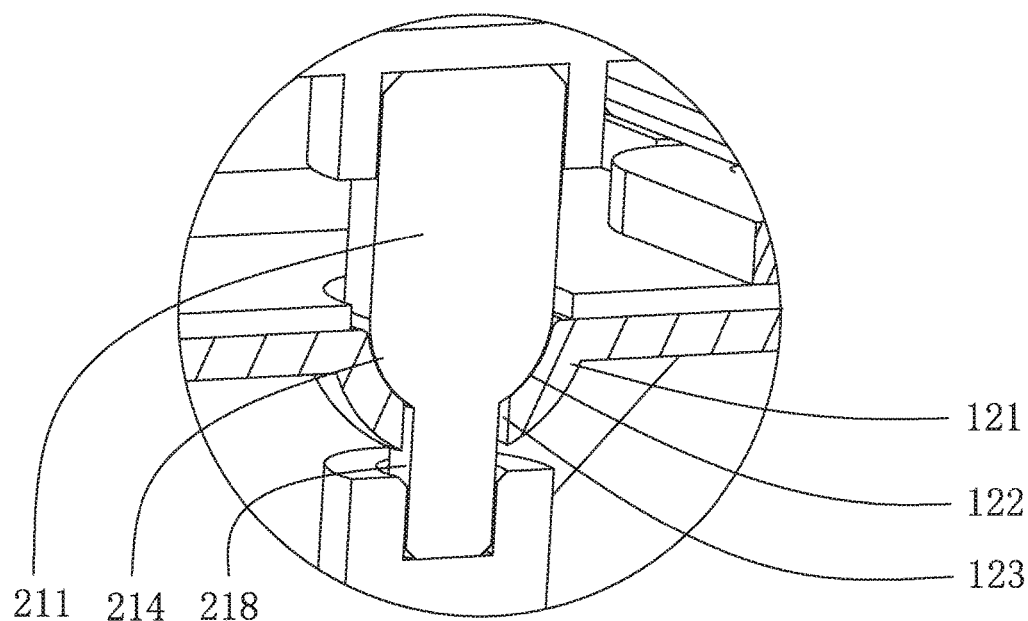
Figure 4:
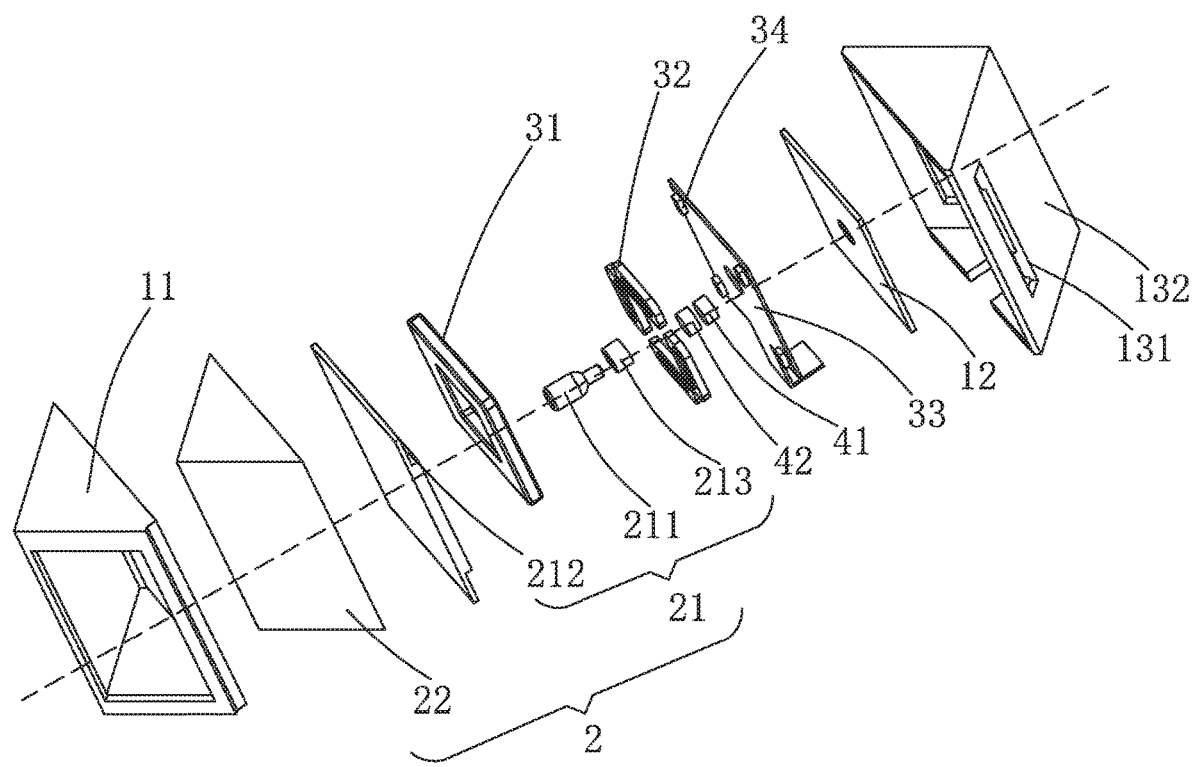
FIG. 4 is an isometric and exploded view of the optical collection module of FIG. 1.

Specifically, referring FIGS. 2, 3, and 11, the arc part 214 of the rotary axis 211 and the accommodation part 122 of the mounting base 121 are spherically matched. The diameter of the extension part 218 at the bottom of the rotary axis 211 is smaller than the diameter of the through hole 123, thereby providing space for the rotary axis 211 to rotate relative to the mounting base 121. When none of the coil 32 is electrified, the rotating assembly 2 is at the initial position relative to the mounting plate 212. At this time, the first force restoring magnet 41 and the second force restoring magnet 42 are directly opposite to each other. When only the first coil group 321 is electrified, one electrified coil of the first coil group 321 attracts the magnet 31, and the other electrified coil repels the magnet 31. The two electrified coils are respectively placed on both sides of the rotary axis 211, thereby, torques in two same direction are generated to drive the rotating assembly 2 to rotate around the X axis direction with the mounting base 121 as a fulcrum. Similarly, when only the second coil group 322 is electrified, the rotating assembly 2 rotates around the Y-axis direction; when both the first coil group 321 and the second coil group 322 are electrified, the rotating assembly 2 can rotate around the combined direction of the Y axis and the X axis. In this way, the rotating assembly 2 can be rotated in multiple directions by adjusting the electrified coil.

Referring to FIGS. 2, 9 and 12, the flexible circuit plate 33 is installed on the fixing plate 12. One end of the flexible circuit plate 33 is integrated and forms a buckle plate 331, meanwhile, one end of the flexible circuit plate 33 is fixed into the fastening slot 134 of the lower housing 13 through the bucket plate 331. Thus, the lower housing 13 and the flexible circuit plate 33 are fixedly connected to prevent the flexible circuit plate 33 from moving relative to the lower housing 13. The magnetism sensor 34 is evenly installed on the flexible circuit plate 33. In this embodiment, the magnetism sensor 34 uses a hall sensor. The hall sensor is installed on the flexible circuit plate 33. The hall sensor is used to measure the magnetic field of the magnet 31. When prism 22 rotates, the zigzag magnet 31 also rotates together, then the distance from the hall sensor to the magnet 31 changes, and the magnetic induction intensity of the magnet 31 measured by hall sensor also changes accordingly.

It should be noted that all directional indications (such as top, bottom, inner, outer, top part, bottom part . . . ) in the embodiment of the present application are only used to explain the relative position relation among the parts under specific state (as shown in attached figures). If the specific state changes, the directional indication changes accordingly.

It should also be noted that when an element is referred to as being "fixed" or "arranged" on another element, the element can be directly on the other element or a middle element may exist at the same time. When an element is referred to as "connected" to another element, it may be directly connected to the other element or a middle element may exist at the same time.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An optical collection module, including:
a bracket;
a rotating assembly rotatably mounted to the bracket, including a main body rotatably mounted on the bracket and a prism installed to the main body;
a driving assembly for driving the rotating assembly to rotate relative to the bracket, including a magnet installed to one of the bracket and the main body and a plurality of coils installed to the other of the bracket and the main body; and
a restoring module for restoring the rotating assembly; wherein
the magnet includes two polar faces along a polarization direction; and the coils are opposite to one of the polar faces of the magnet;
the restoring module includes a first force restoring magnet and a second force restoring magnet spaced apart from each other; the first force restoring magnet is installed to the bracket, the second force restoring magnet is installed to the rotating assembly; the first force restoring magnet and the second force restoring magnet are opposite and attract each other;
the main body includes a rotary axis, the bracket includes a mounting base, and the rotary axis and the mounting base are spherically matched;
the mounting base is provided with a through hole, and one end of the rotary axis is connected to the second force restoring magnet via the through hole.

2. The optical collection module as described in claim 1, wherein the main body further includes a mounting plate, the prism is installed on one side of the mounting plate, and the magnet and the rotary axis are mounted on the other side of the mounting plate.

3. The optical collection module as described in claim 1, wherein the main body further includes a connector, a groove is provided at one end of the connector, and one end of the rotary axis is fixed into the groove after passing through the through hole, the other end of the connector is connected to the second force restoring magnet.

4. The optical collection module as described in claim 1, wherein the bracket includes a lower housing and a fixing plate installed on the lower housing, and the first force restoring magnet is installed on the lower housing, the mounting base is arranged on the fixing plate.

5. The optical collection module as described in claim 4, wherein the lower housing includes two side walls for forming a triangle shape cooperatively with the fixing plate, and the first force restoring magnet is installed at a junction of the two side walls.

6. The optical collection module as described in claim 5, wherein the triangle is an isosceles triangle, and when the coil is not powered, the mounting plate, the rotary axis, the center of the first force restoring magnet and the second force restoring magnet are located along a straight line.

* * * * *